United States Patent [19]

Triplett et al.

[11] Patent Number: 5,338,716
[45] Date of Patent: Aug. 16, 1994

[54] NON-OXIDE METAL CERAMIC CATALYSTS COMPRISING METAL OXIDE SUPPORT AND INTERMEDIATE CERAMIC PASSIVATING LAYER

[75] Inventors: Kelly B. Triplett, Stamford, Conn.; Johst H. Burk, Mohegan Lake, N.Y.; Fawzy G. Sherif, Stony Point, N.Y.; Willem Vreugdenhil, Katonah, N.Y.

[73] Assignee: Akzo Nobel nv, Arnhem, Netherlands

[21] Appl. No.: 984,129

[22] Filed: Dec. 1, 1992

[51] Int. Cl.$^5$ .................... B01J 29/06; B01J 27/224; B01J 27/22; B01J 27/24
[52] U.S. Cl. .................... 502/64; 502/177; 502/179; 502/200; 502/527; 585/734
[58] Field of Search ............ 502/178, 177, 64

[56] References Cited

U.S. PATENT DOCUMENTS

| | | | |
|---|---|---|---|
| 2,755,228 | 7/1956 | Ahhorn et al. | 502/177 |
| 4,325,843 | 4/1982 | Slaugh et al. | 252/443 |
| 4,326,992 | 4/1982 | Slaugh et al. | 252/443 |
| 4,522,708 | 6/1985 | Leclercq et al. | 208/136 |
| 4,536,358 | 8/1985 | Welsh | 427/249 |
| 4,703,028 | 10/1987 | Steinmyer | 502/178 |
| 4,906,493 | 3/1990 | Laine | 427/226 |
| 4,914,070 | 4/1990 | Ladoux et al. | 502/178 |
| 5,120,692 | 6/1992 | Beck | 502/60 |
| 5,137,924 | 8/1992 | Short et al. | 518/700 |
| 5,157,007 | 10/1992 | Domesle et al. | 502/66 |
| 5,196,389 | 3/1993 | Dubots | 502/178 |

OTHER PUBLICATIONS

Catalysis Today, 15, pp. 179–200 (1992).
A. Brenner et al., "Reversibility in the Formation of Stoichometric Surface Molybdenum Carbonyls on Aluina", Journal of the American Chemical Society, 97:9 Apr. 30, 1975 pp. 2565–2566.
D. E. Willis, "Formation of Tungsten Carbide During Carbon Monoxide Activation of Tungsten Oxide on Silica Disproportionation Catalysts", Journal of Catalysis 84, 344–357 (1983).
M. J. Ledoux et al., "New Synthesis and Uses of High Specific-Surface SiC as a Catalytic Support That is Chemically Inert and Has High Thermal Resistance", Journal of Catalysis 114, 176–185 (1988).
J. S. Lee et al., "Preparation and Benzene Hydrogenation Activity of Supported Molybdenum Carbide Catalysis", Journal of Catalysis 128, 126–136 (1991).

Primary Examiner—Paul E. Konopka
Attorney, Agent, or Firm—Richard P. Fennelly; Louis A. Morris

[57] ABSTRACT

Supported non-oxide metal carbide-containing catalysts are provided which comprise: (a) an oxide support, such as alumina or cordierite; (b) a passivating layer of a ceramic, such as silicon carbide; and (c) a non-oxide metal ceramic catalytic component, such as a Group VI metal carbide or nitride, preferably tungsten carbide or molybdenum carbide.

10 Claims, No Drawings

NON-OXIDE METAL CERAMIC CATALYSTS COMPRISING METAL OXIDE SUPPORT AND INTERMEDIATE CERAMIC PASSIVATING LAYER

BACKGROUND OF THE INVENTION

While most of the disclosures of non-oxide metal ceramic catalysts, e.g., transition metal carbides or nitrides, as catalysts relate to the use of unsupported metal catalyst component, certain disclosures do exist which describe supported metal catalyst systems.

L. Leclercq et al., in U.S. Pat. No. 4,522,708 discusses several supported carbide systems including work by Mitchell and co-workers in supporting molybdenum on active carbon and other work relating to Group VI metals on alumina (e.g., U.S. Pat. Nos. 4,325,843 and 4,326,992).

Lee et al., in Journal of Catalysis 128, 126–136 (1991) alludes to the "strong interaction" between molybdenum oxide and such support materials as silica or alumina in the manufacture of supported molybdenum catalysts.

SUMMARY OF THE INVENTION

The present invention relates to a non-oxide metal ceramic catalyst which comprises:
(a) an oxidic support;
(b) a passivating layer of a ceramic on the support; and
(c) a non-oxide metal ceramic catalyst on the passivating layer.

DETAILED DESCRIPTION OF THE INVENTION

The supported non-oxide metal ceramic catalyst of the present invention has three essential components: (a) a support; (b) a passivating layer; and (c) a non-oxide metal catalyst layer.

The support for the supported catalysts of the present invention is an oxidic support, such as silica, alumina, alumina-silica, titania, magnesia-alumina-silica, cordierits, or a zeolite, preferably in the form of a high surface area solid which is substantially anhydrous.

The passivating layer which is placed on the aforementioned support is a ceramic, such as silicon carbide or silicon nitride, which serves to separate the oxidic support from the catalyst layer which will be described in greater detail below. The resulting catalytic metal ceramic, if present on such an oxidic support and utilized in such an environment for an extended length of time, can undesirably react with the oxidic support and lose activity, for example. The passivating ceramic component can be formed on the support by impregnating the latter with an appropriate precursor for the ceramic passivating component (e.g., a polymeric precursor such as a polycarbosilane) followed by pyrolysis of the precursor.

The purpose of the passivating layer is not only to eliminate the interaction of the support with the catalytic layer but also to prevent the acidity of the support, if present (as in alumina), to catalyze undesirable side reactions such as hydrogenolysis or cracking of paraffins, instead of forming the desired, useful products, such as isomers or aromatics. It has been found, for example, that a silicon carbide passivating layer covers most of the acid sites in an alumina support with the resulting catalytic reaction being due to the metallic properties of the non-oxide metal ceramic catalyst (such as tungsten carbide as shown in Example 11). Such a catalyst can be useful in the isomerization and aromatization of hydrocarbons containing sulfur, since tungsten carbide, for example, resists sulfur, contrary to platinum which is poisoned by sulfur and which requires desulfurized feed stocks.

Once the oxidic support has been coated with the passivating ceramic layer, the resulting combination is coated with the desired non-oxide metal ceramic catalyst, e.g., a Group VIB metal carbide or nitride, such as molybdenum carbide, tungsten carbide, molybdenum nitride, and the like. This can be done using techniques known to persons of ordinary skill in the art such as by the deposition and pyrolysis of Group VIB carbonyls or the use of other chemical precursors (e.g., the reaction of the Group VIB chloride with guanidine, such as shown in Example 3, followed by calcining of the resulting tungsten-containing carbon atom-containing composition).

It is within the scope of the present invention to utilize co-extrusion techniques known to persons of ordinary skill in the art in the fabrication of one or more of the component portions of the subject catalyst. For example, the combination of oxidic support and passivating layer can be formed by co-extruding the respective components. If desired, the resulting composition can be co-extruded with the non-oxide metal ceramic component. An alternative procedure using co-extrusion co-extrudes the oxidic support with a mixture of passivating ceramic and non-oxide metal ceramic in a single step. Impregnation and co-extrusion techniques can be combined, as would be apparent to the person in the art, in forming the complete catalyst configuration.

The following Examples further illustrate the present invention.

EXAMPLE 1

Boehmite alumina was extruded into 1/32 inch cylinders and calcined at 950° C. This alumina was used as the support for Examples 2–4. Its surface area was 155 $m^2g$ and its pore volume was 0.72 cc/g.

EXAMPLE 2

In this Example an alumina support was coated with a protective layer of silicon carbide.

Alumina extrudates (25 g) from Example 1 was mixed with 20 gm of a solution made by dissolving 4.7 gm of polycarbosilane (from Nippon Carbon Company, Ltd.) in 15 gm of hexane. The polycarbosilane solution was just enough to completely wet the alumina. The wet alumina extrudates were dried at 150° C. for thirty minutes and were then calcined under nitrogen at 1100° C for two hours. Upon cooling, the extrudates appeared black throughout. The weight of the product was 28.3 g. The calculated weight for alumina plus silicon carbide was 28.2 g.

EXAMPLE 3

In this Example, the silicon carbide-coated alumina from Example 2 was coated with a second coating of tungsten carbide to form the composition of the present invention Twenty grams of the product from Example 2 was admixed with 12 gm of tungsten hexachloride and 8.6 gm of guanidine hydrochloride and heated at about 260°

C. in a round bottom flask with mixing until most of the hydrogen chloride was evolved and white fumes of ammonium chloride started to appear. The material was then calcined at 750° C. for two hours under nitrogen.

EXAMPLE 4

In this Example, the alumina product from Example 1 was coated with tungsten carbide directly without a protective intermediate layer of silicon carbide.

The alumina extrudates (25 g) were impregnated with a 25 cc ethanolic solution containing 2.7 gm of guanidine hydrochloride and 3.75 gm of tungsten hexachloride. The wet product that resulted was dried under nitrogen flow at room temperature and then calcined at 750° C. for two hours under nitrogen.

EXAMPLE 5

The various compositions of Examples 1–4 were tested as potential catalysts in the isomerization of heptane. The composition of Example 3 corresponds to the invention.

A 5 ml tubular microreactor was used at ambient pressure. The compositions (1 gm each) were crushed and loaded into the reactor in separate runs. The catalyst candidates were each supported by glass wool and were activated by being heated to 520° C. under a flow of hydrogen gas at 10 cc/min for fifteen hours. Hydrogen (10 cc/min) was then passed through a saturator containing heptane at room temperature and the heptane-loaded gas was fed over each catalyst candidate composition. The catalyst candidate bed temperature was held at 330° C. during each run and the products that were produced were analyzed on-line using gas chromatograph. The following results were obtained:

|  | Time on Stream (hrs) | Ex. 1 | Ex. 2 | Ex. 3 | Ex. 4 |
| --- | --- | --- | --- | --- | --- |
| Conversion | 0.5 | 0 | 0 | 61 | 26 |
| Selectivity |  | 0 | 0 | 14 | 63 |
| Conversion | 3 | 0 | 0 | 33 | 19 |
| Selectivity |  | 0 | 0 | 32 | 71 |
| Conversion | 7 | 0 | 0 | 20 | 10 |
| Selectivity |  | 0 | 0 | 59 | 83 |

The data given above reveals distinctly higher conversions over the course of the runs for the composition containing the protective intermediate silicon carbide layer (Example 3) as compared to a catalyst not containing it (Example 4). The alumina substrate (Example 1) and the substrate coated with silicon carbide alone (Example 2) were inactive.

EXAMPLE 6

This Example demonstrates the stability of the composition containing tungsten carbide, silicon carbide, and alumina which is described in Example 3 as compared to the composition described in Example 4 containing tungsten carbide on alumina.

Two grams of each composition was heated under nitrogen side-by-side in a furnace at a temperature of 930° C. for two hours to simulate extensive use. Upon cooling, the composition of Example 3 maintained its black color, while the composition from Example 4 was discolored to a mixture of white and grey particles, indicating its decomposition and instability. Upon exposure to air for two days, the composition of Example 3 had maintained its black color, while the composition from Example 4 changed completely to a mixture of white and yellow, indicating the formation of the yellow tungsten trioxide formed from the decomposition of the black tungsten carbide.

This Example illustrates the use of cordierite, ($MgO \cdot 2Al_2O_3 \cdot 5SiO_2$), as a support. The cordierite can be a monolith, such as that used for automotive catalytic converters, or a powder.

A monolith cordierite cylindrical piece (2.2×6 cm) from Corning with 100 square cavities per square centimeter, and a weight of 13.9 gm was coated five times with a solution containing 20 gm of polycarbosilane in 80 gm hexane, with intermittent drying at 100° C. between coatings. The material was then calcined at 1100° C. for two hours under argon. Upon cooling, the monolith turned completely black indicating a coating with silicon carbide had formed. The final weight was 15.3 g.

In a different experiment, 50 gm of powdered cordierite from Baikoski was first heated at 1100° C. for two hours and was then impregnated with polycarbosilane and refired at 1100° C. for two hours to form a black powder indicating the formation of a coating of silicon carbide. It was found that if the powdered cordierite was not precalcined before impregnation, a white powder was formed due to the hydrolysis of the carbosilane to silica.

EXAMPLE 9

This Example illustrates the formation of a final catalytic material containing tungsten carbide supported on a silicon carbide-coated cordierite from Example 8. Twenty grams of the coated powdered cordierite described in Example 8 was ground with 10 gm of a powder formed from the reaction of 15 gm guanidine hydrochloride and 20 gm of tungsten hexachloride. The mixture was then calcined at 1100° C. for two hours under argon. A mixture of black and white particles was formed.

EXAMPLE 10

In this Example, the silicon carbide-coated alumina product from Example 2 was coated with a second coating of tungsten carbide to form a composition in accordance with the present invention. The amount of tungsten carbide coating employed was one and one-half times the coating used in Example 3.

Sixty grams of tungsten hexachloride was admixed with 43 gm of guanidine hydrochloride in the fabrication of the tungsten carbide coating. This mixture was first melted with the evolution of hydrogen chloride. Then, 20 gm of the product from Example 2 was mixed into the resulting melt. The mixture solidified and was then calcined at 775° C. for two hours under nitrogen.

EXAMPLE 11

The material from Example 10 was tested as a potential catalyst in the isomerization of heptane in this Example.

A 100 ml tubular reactor was used at ambient pressure for the isomerization test. Three grams of the material from Example 10 was loaded into the reactor and was activated by being heated to 500° C. for sixteen hours under a flow of hydrogen gas at 100 cc/min. Hydrogen gas was then passed through a saturator containing heptane at the same rate at room temperature, and the heptane-loaded hydrogen gas was then fed over the catalyst which was at a temperature of from 400° C.–500° C. The products that were produced were analyzed on-line using gas chromatography. The following results were obtained:

| Catalyst Bed Temp. (°C.) | Conversion (%) | Selectivity (%) | | |
|---|---|---|---|---|
| | | Isomers | Aromatics | Hydrogenolysis Products |
| 400 | 15 | 92 | 2 | 6 |
| 500 | 75 | 7 | 86 | 7 |

The above data demonstrate a low hydrogenolysis rate, even at 500° C. The low hydrogenolysis value of 6% at 400° C. and the 7% value at 500° C. indicated that most of the acid sites of the alumina support were passivated or covered by the silicon carbide. In the absence of the silicon carbide coating hydrogenolysis would vary between 50% and 70% at 500° C. The catalyst of Example 11 is useful in reforming sulfur-containing hexane and heptane compositions to aromatics since the tungsten carbide is sulfur-resistant.

The foregoing Examples, since they are presented for illustrative purposes only, should not be construed in a limiting sense. The scope of protection sought is set forth in the claims which follow.

We claim:

1. A supported non-oxide metal ceramic catalyst which comprises:
    (a) an oxidic support;
    (b) a passivating layer, on the support, of a ceramic silicon carbide; and
    (c) a non-oxide metal-containing ceramic catalyst component from the group consisting of Group VIB transitional metal carbide and nitride on the passivating layer.

2. A catalyst as claimed in claim 1 wherein the oxidic support is selected from the group consisting of silica, alumina, alumina-silica, magnesia-alumina-silica, zeolite, and titania.

3. A catalyst as claimed in claim 1 wherein the non-oxide metal-containing ceramic is a Group VIB transition metal carbide.

4. A catalyst as claimed in claim 1 wherein the non-oxide metal-containing ceramic is molybdenum carbide.

5. A catalyst as claimed in claim 1 wherein the non-oxide metal-containing ceramic is tungsten carbide.

6. A catalyst as claimed in claim 1 wherein the oxidic support is alumina, the passivating layer ceramic is silicon carbide, and the non-oxide metal ceramic is tungsten carbide.

7. A catalyst as claimed in claim 1 wherein the oxidic support is cordierite, the passivating layer ceramic is silicon carbide, and the non-oxide metal ceramic is tungsten carbide.

8. A catalyst as claimed in claim 2 wherein the non-oxide metal-containing ceramic is a Group VIB transition metal carbide.

9. A catalyst as claimed in claim 2 wherein the non-oxide metal-containing ceramic is molybdenum carbide.

10. A catalyst as claimed in claim 2 wherein the non-oxide metal-containing ceramic is tungsten carbide.

* * * * *